US010843792B2

(12) United States Patent
Avritch et al.

(10) Patent No.: US 10,843,792 B2
(45) Date of Patent: Nov. 24, 2020

(54) AUTONOMOUS RECONFIGURATION OF A MULTI-REDUNDANT ACTUATOR CONTROL SYSTEM

(71) Applicant: Hamilton Sundstrand Corporation, Charlotte, NC (US)

(72) Inventors: Steven A. Avritch, Bristol, CT (US); Jeffrey A. Eldridge, Ellington, CT (US); David F. Dickie, Bloomfield, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 240 days.

(21) Appl. No.: 15/886,609

(22) Filed: Feb. 1, 2018

(65) Prior Publication Data

US 2019/0233087 A1 Aug. 1, 2019

(51) Int. Cl.
 *B64C 13/50* (2006.01)
 *B64C 27/57* (2006.01)
 *G05D 1/00* (2006.01)
 *H02P 29/024* (2016.01)

(52) U.S. Cl.
 CPC ............ *B64C 13/503* (2013.01); *B64C 27/57* (2013.01); *G05D 1/0077* (2013.01); *G05D 1/0088* (2013.01); *H02P 29/0241* (2016.02)

(58) Field of Classification Search
 None
 See application file for complete search history.

(56) References Cited

U.S. PATENT DOCUMENTS

| | | | | |
|---|---|---|---|---|
| 4,472,780 A | * | 9/1984 | Chenoweth | G05D 1/0077 244/194 |
| 5,670,856 A | * | 9/1997 | Le | G05D 1/0077 244/194 |
| 5,806,805 A | * | 9/1998 | Elbert | B64C 13/42 244/195 |
| 6,776,376 B2 | * | 8/2004 | Collins | B64C 13/341 244/213 |
| 7,017,861 B1 | * | 3/2006 | Johansson | G05B 9/03 244/194 |
| 7,098,619 B2 | * | 8/2006 | Stridsberg | B64C 13/00 318/563 |

(Continued)

OTHER PUBLICATIONS

Extended European Search Report for European Patent Application No. EP19154772.8, dated May 15, 2019.

*Primary Examiner* — Joshua E Rodden
(74) *Attorney, Agent, or Firm* — Locke Lord LLP; Scott D. Wofsy; Judy R. Naamat

(57) ABSTRACT

A fly-by-wire system includes an electromechanical actuator which includes a plurality of electromechanical motors. Each of the plurality of electromechanical motors is configured and operable to exchange operating status information with the other redundant electromechanical motors within the actuator. Also, each one of the plurality of electromechanical actuators is configured and operable to automatically configure itself for optimal mode of operation based on the received operating status information of at least one of the other electromechanical motors. The fly-by-wire system further includes a flight control computer operatively connected to the plurality of electromechanical motors within the actuator.

18 Claims, 10 Drawing Sheets

(56) References Cited

U.S. PATENT DOCUMENTS

| | | | |
|---|---|---|---|
| 7,549,605 B2* | 6/2009 | Hanlon | B64C 13/505 244/75.1 |
| 7,607,611 B2* | 10/2009 | Wingett | B64C 13/00 244/99.3 |
| 8,538,602 B2 | 9/2013 | Brot | |
| 8,600,583 B2 | 12/2013 | Fervel et al. | |
| 8,755,956 B2* | 6/2014 | Goupil | G01M 17/00 701/14 |
| 8,761,969 B2* | 6/2014 | Sghairi | B64C 13/24 701/4 |
| 8,805,600 B2* | 8/2014 | Sghairi | G05D 1/0077 701/3 |
| 8,814,085 B2* | 8/2014 | Richter | B64D 45/0005 244/99.4 |
| 8,818,574 B2* | 8/2014 | Fukui | G05D 1/0077 701/3 |
| 8,930,036 B2 | 1/2015 | Das et al. | |
| 9,081,372 B2 | 7/2015 | Fervel et al. | |
| 9,156,547 B2* | 10/2015 | Dickman | B64C 27/605 |
| 9,168,995 B2* | 10/2015 | Brot | G05D 1/0077 |
| 9,540,096 B2 | 1/2017 | Lin et al. | |
| 9,663,221 B2* | 5/2017 | Ishihara | B64C 9/02 |
| 9,701,404 B2* | 7/2017 | Shue | G05D 1/0077 |
| 10,183,739 B2* | 1/2019 | Hara | B64C 13/42 |
| 2006/0255207 A1* | 11/2006 | Wingett | B64C 13/00 244/99.4 |
| 2007/0007385 A1* | 1/2007 | Potter | B64C 13/505 244/53 R |
| 2007/0164166 A1* | 7/2007 | Hirvonen | G05D 1/0077 244/175 |
| 2010/0084517 A1* | 4/2010 | Benson | B64C 27/605 244/228 |
| 2016/0114882 A1* | 4/2016 | Lin | G05D 1/0077 701/3 |
| 2017/0220018 A1 | 8/2017 | Armbruster et al. | |
| 2019/0303278 A1* | 10/2019 | Dickie | G05B 23/0256 |

\* cited by examiner

AUTONOMOUS RECONFIGURATION OF A MULTI-REDUNDANT ACTUATOR CONTROL SYSTEM

FIELD OF THE INVENTION

The present disclosure relates to actuators, and more particularly to autonomous reconfiguration of a multi-redundant actuator control system.

BACKGROUND OF THE INVENTION

Vehicles like aircraft commonly include fly-by-wire flight control systems. Such systems typically include a plurality of actuators that move various flight control surfaces as commanded by a plurality of flight control computers. In safety critical aircraft flight control systems, typically at least triplex redundancy is required so that in case any one, or two of the command paths fail, the aircraft will remain under control. Modern actuators, including a plurality of smart actuators, do not have the ability to operate autonomously. The "smartness" of the actuator is typically limited to basic servo position loop closure and some minimal built-in test. These modern smart actuators are not always capable of independently tolerating system faults and command outages (that could be caused by flight control computer resets, for example). Primary responsibility for detecting flight control system failures (including electromechanical motor failures) and subsequent reconfiguration to accommodate said failures has been relegated to the flight control computers.

Thus, there is a need in the art for improved actuator systems and methods that include a complete set of robust reconfiguring mode logic algorithms to ensure that actuators continuously monitor their status and that they are capable of autonomously configuring their power and movement to the best possible control state without the flight control computer supervision or intervention. The present disclosure provides a solution for this need.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a fly-by-wire system includes an electromechanical actuator which includes a plurality of electromechanical motors. Each of the plurality of electromechanical motors is configured and operable to exchange operating status information with the other redundant electromechanical motors within the actuator. Also, each one of the plurality of electromechanical actuators is configured and operable to automatically configure itself for optimal mode of operation based on the received operating status information of at least one of the other electromechanical motors. The fly-by-wire system further includes a flight control computer operatively connected to the plurality of electromechanical motors within the actuator.

In another aspect, a method for autonomously reconfiguring a multi-redundant actuator control system includes exchanging operating status information between a plurality of electromechanical motors within an electromechanical actuator and a flight control computer. The flight control computer is operatively connected to the plurality of electromechanical motors. Each of the plurality of electromechanical motors is automatically configured for optimal mode of operation based on the exchanged operating status information.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
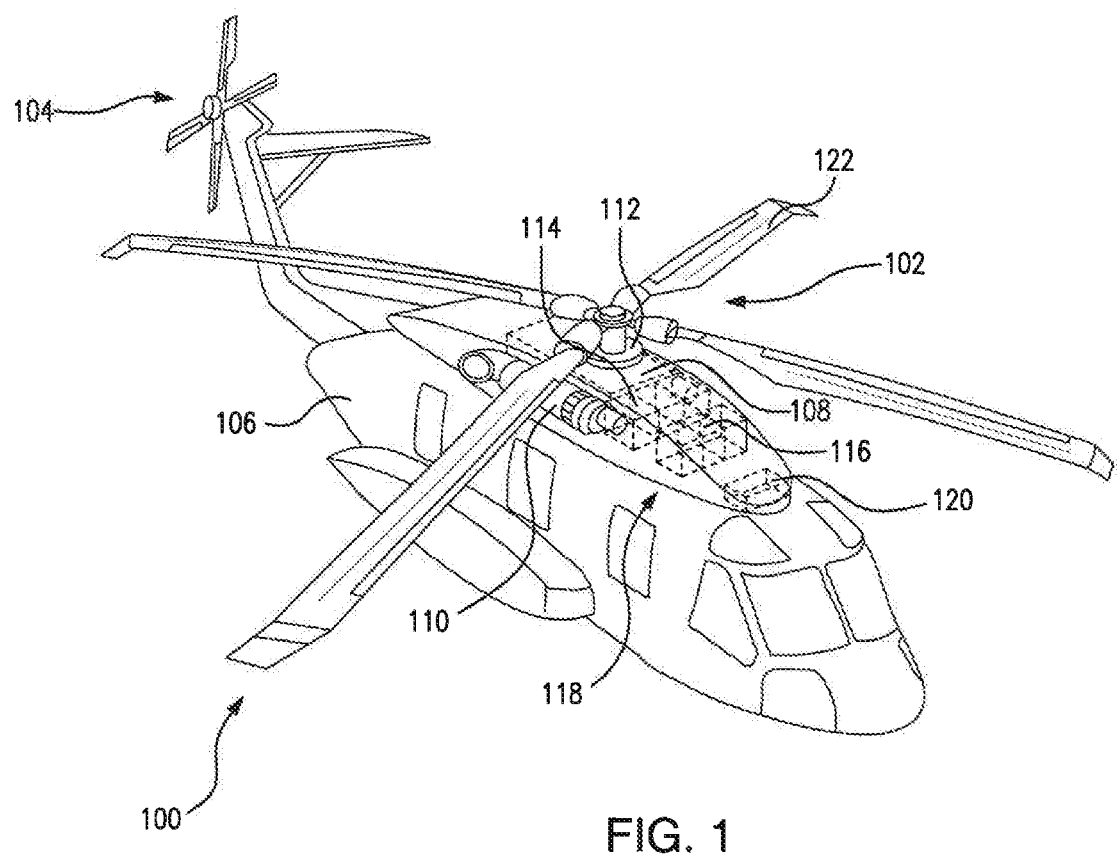
FIG. 1 is a schematic view of an exemplary embodiment of a vertical take-off and landing (VTOL) aircraft constructed in accordance with the present disclosure, showing actuators operatively connected to hydraulic systems and a flight control computer.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Implementation of the techniques, blocks, steps and means described below may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps and means.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Embodiments of the present invention are directed to a multi-redundant actuator. Behaviors that characterize the operational mode of the vehicle are associated with the actuators. A complete fly-by-wire flight control system typically controls multiple independent surfaces (for example, left and right ailerons). The system includes independent actuators for each surface. Multiple electromechanical motors may drive a single actuator (redundant drive mechanism). More specifically, the electromechanical motors, operating in conjunction with one another, drive the specific flight surface they are tasked with driving. In various embodiments multiple electromechanical motors that are driving one flight control surface interact with each other and autonomously configure themselves based on current operating conditions. Each of the actuators contains control logic that monitors inputs and fault status and properly configures all the redundant electromechanical motors to the optimal control state (mode of operation). The redundant control electromechanical motors communicate with each other to determine which one is in control (master mode) and which ones slave to the master (slave mode). Advantageously, embodiments of the present invention provide the redundant actuator capable of self-configuring autonomously from a command source. The command source is typically a flight control computer operable in a flight state and a ground state. According to embodiments of the present invention, the redundant actuator system is configured to control performance of the redundant suite of electromechanical motors prior to commands being available from the command source.

Reference will now be made to the drawings wherein like reference numerals identify similar structural features or aspects of the subject disclosure. For purposes of explanation and illustration, and not limitation, a partial view of an exemplary embodiment of an aircraft, here, an exemplary embodiment of an aircraft as a vertical takeoff and landing (VTOL) aircraft in accordance with the disclosure is shown in FIG. 1 and is designated generally by reference character 100. Other embodiments of aircraft in accordance with the disclosure, or aspects thereof, are provided in FIGS. 2-3, as will be described. The systems and methods described herein provide for increased reliability multi-redundant actuators that can be used in fly-by-wire systems, while providing an ability to operate autonomously as compared with traditional actuator systems.

As shown in FIG. 1, VTOL aircraft 100 includes a main rotor system 102 and tail rotor system 104 supported by an airframe 106. Airframe 106 includes a gearbox 108 interconnecting an engine 110 with main rotor system 102 and tail rotor system 104. Main rotor system 102 is operatively connected to a swash plate 112. Swash plate 112 is operatively connected to hydraulic systems 114. VTOL aircraft 100 includes linear actuators 116, e.g. electromechanical actuators, operatively connected to the hydraulic systems 114, for example, a mechanical hydraulic servoactuator. Although a particular VTOL aircraft configuration is illustrated and described in the disclosed embodiment, other configurations and/or machines, such as fixed wing aircraft, high speed compound rotary wing aircraft with supplemental translational thrust systems, dual contra-rotating, coaxial rotor system aircraft, turbo-props, tilt-rotors and tilt-wing aircraft, will also benefit from the present invention.

Although the fly-by-wire system 118 illustrated in FIG. 1 includes three actuators 116, other numbers of actuators may be used in other exemplary embodiments. System 118 includes a flight control computer 120 operatively connected to each of electromechanical motors 306. Each actuator 116 of system 118 is operatively connected to a respective one of hydraulic systems 114. System 118 includes a flight control surface 122 of a rotorcraft, e.g. VTOL aircraft 100, operatively connected to at least one of three hydraulic systems 114 through swash plate 112.

Figure 2:
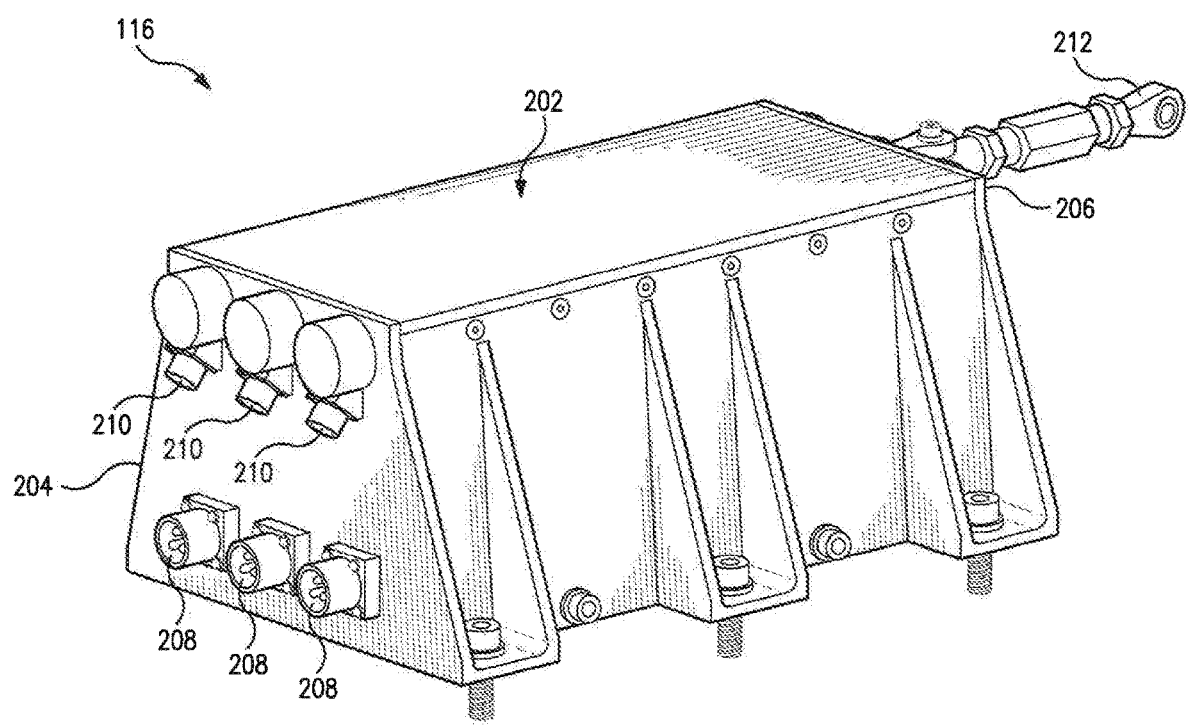
FIG. 2 is a perspective view of one of the actuators in the VTOL aircraft of FIG. 1, showing the actuator housing.
Figure 3:
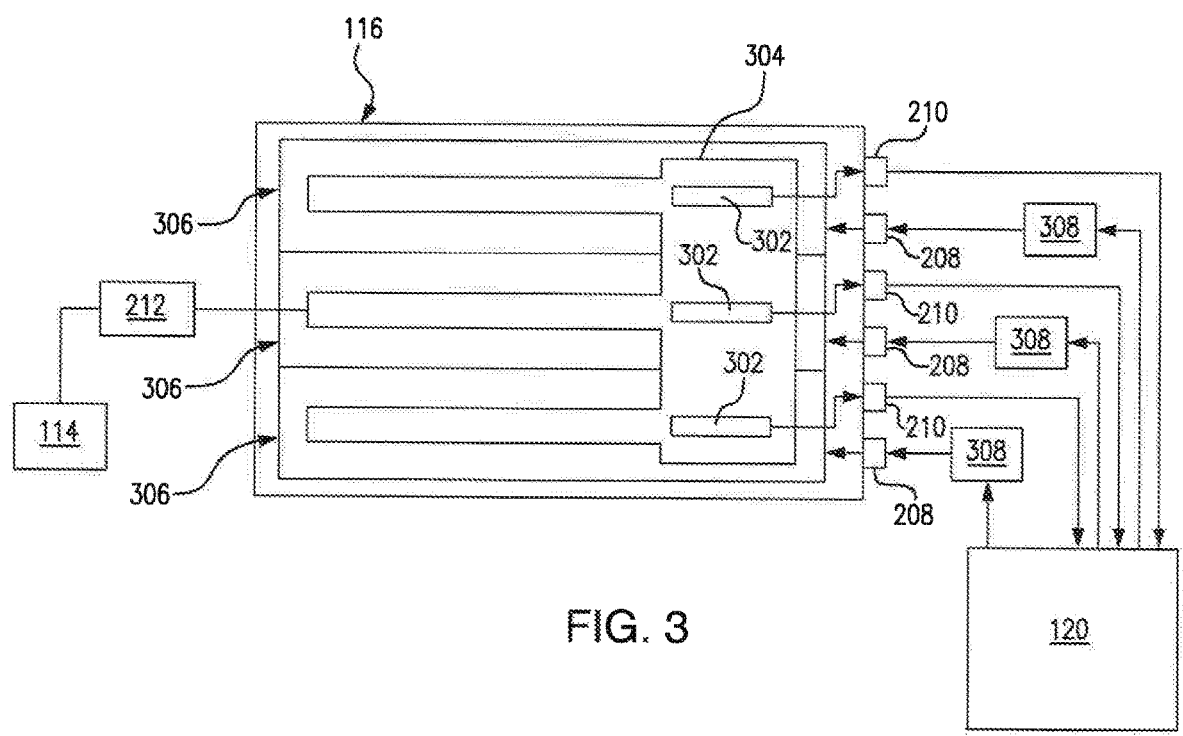
FIG. 3 is a schematic depiction of the actuator of FIG. 2, showing the connections between the signal connectors and electromechanical motor power connectors.

With reference now to FIGS. 2 and 3, actuator 116 includes a housing 202. Housing 202 includes a connector side 204 and a forcer rod side 206. Housing connector side 204 includes electromechanical motor power connectors 208 and signal connectors 210. Electromechanical motor power connectors 208 are operatively connected between an electromechanical motor drive 308, schematically shown in FIG. 3, and respective electromechanical motors 306, described below, to operatively connect electromechanical motors 306 to motor drive 308. Actuator 116 includes a plurality of linear variable differential transformers (LVDT) 302, e.g. a position sensor, to measure the absolute displacement of electromechanical motors 306. Signal connectors 210 operatively connect respective LVDTs 302 to flight control computer 120. Signal connectors 210 receive actuator position signals from each LVDT 302 and send them to flight control computer 120, which compares the true position of actuator 116 to the commanded position from the pilot.

As schematically shown in FIG. 3, signal connectors 210 each correspond to a respective LVDT 302. Each LVDT 302 is in electrical communication with flight control computer 120 through signal connectors 210 to convey the position of LVDTs 302 and carriage 304. The position of carriage 304 corresponds to a respective position of each one of electromechanical motors 306. As such, by monitoring the position of carriage 304 and LVDTs 302 through signal connectors 210, actuator controller and flight control computer 120 can appropriately adjust the power sent from electromechanical motor drives 308 to electromechanical motors 306 through motor power connectors 208 in order to achieve a desired position of carriage 304 along the longitudinal axis of actuator 116. The desired position of carriage 304 will depend on the input from the pilot or other control system. Those skilled in the art will readily appreciate that actuator 116 segregates three motor power connectors 208 and the three signal connectors 210, providing true redundancy between the systems, reducing the probability of failure due to a connector shorting out, or getting wet and losing connectivity.

Figure 4:
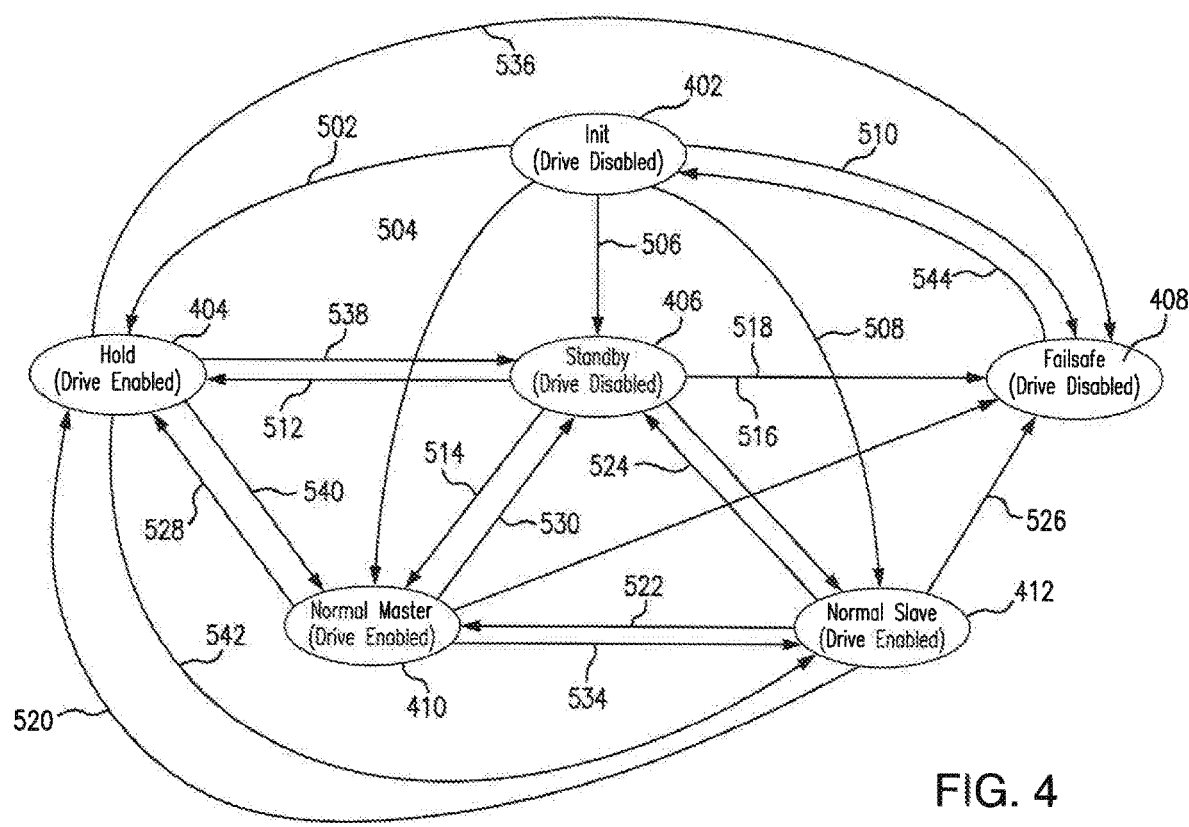
FIG. 4 illustrates an exemplary state diagram that specifies the operation of a multi-redundant actuator control system, in accordance with an embodiment of the present invention.

FIGS. 4, 5A-5F illustrate various states and transitions supported by the disclosed multi-redundant actuator system. As shown in FIG. 4, the electromechanical motor may assume one of the following states/modes: Init 402, Hold 404, Standby 406, Failsafe 408, Normal Master 410 and Normal Slave 412. For one preferred embodiment, the establishment of "master" versus "slave" status is automatically optimized for each electromechanical motor to best meet the current operating conditions as can be best sensed and/or predicted by the motor units.

In one embodiment, the Init mode 402 may run an initialization routine (initialization code) which enables the electromechanical motor 306 to communicate with the remaining electromechanical motors and with the FCC 120. Initialization code may be generated by a high-level language compiler into the embedded system programming. Electromechanical motor's drive is disabled in the Init mode 402.

Standby mode 406 is opposite of active modes (such as Normal modes 410, 412, for example). In other words, if a first electromechanical motor powers a flight surface for movement in response to commands from the FCC 120, a second electromechanical motor may be placed in Standby mode 406 by the FCC 120 to provide as little resistance to flight surface's movement as possible. Electromechanical motor's drive is disabled in the Standby mode 406.

An inoperable Failsafe mode 408 is also provided which is entered in the event a critical condition is detected by the system. Electromechanical motor's drive is disabled in the Failsafe mode 408 as well.

According to embodiments of the present invention, three active modes are provided: Normal Slave mode 412, Normal Master mode 410 and Hold mode 404. The Master mode 410 is an operation mode for an electromechanical motor to maintain control of the multi-redundant actuator system. The electromechanical motor operating in the Master mode 410 can further control and manage other electromechanical motors operating in Slave mode 412. The Slave mode 412 is an operation mode for an electromechanical motor to allow the other electromechanical motor, operating in Master mode 410, to control and manage the system. If the electromechanical motor operating in Master mode 410 stops receiving commands from the FCC 120, it automatically transfers into the Hold mode 404 and holds its current position until a command is received from the FCC 120 or until another mode exit criteria are met, as discussed below.

According to embodiments of the present invention, the disclosed multi-redundant actuator system includes control logic configured to implement a set of rules. In an embodiment, according to the rule set, the system should have at least one electromechanical motor driving a control surface except for the following situations: a) FCC 120 sends disable signals to all electromechanical motors; b) all electromechanical motors are commanded by FCC 120 to transition to Standby mode 406 for more than persistence. It should be noted that if a particular electromechanical motor automatically transitions to Normal state 410, 412 and FCC 120 does not reciprocate with a normal mode command within a predefined number of communication cycles, then the electromechanical motor is configured to automatically transfer back to Standby mode 406.

According to another preconfigured rule of the disclosed multi-redundant actuator system, in a highly unlikely case of all electromechanical motors entering Normal state 410,412 at exactly the same time instance, the first electromechanical motor gets a priority for the "master" status. Once a particular electromechanical motor 306 gets a "master" designation, that electromechanical motor 306 stays in Master mode 410 until mode exit criteria (discussed below) are met. Advantageously, each autonomous motor 306 is configured to ignore FCC mode command and configured to automatically transition into Normal state 410, 412, in response to determining that no other electromechanical motor is currently driving the system. This functionality enables multi-redundant actuator control system's logic to substantially immediately transfer control to alternate electromechanical motor (in case of a failure of a driving "master" electromechanical motor), while waiting for the FCC 120 to reciprocate with Normal mode 410, 412 command. In this case, the designated "master" electromechanical motor stays in Normal mode 410, 412 for a predefined number of communication cycles, even if the FCC 120 commands this particular electromechanical motor to go to Standby mode 406. Advantageously, this functionality allows the FCC 120 to recognize the failure and react to the failure, for example, by commanding the proper mode to the remaining electromechanical motors. At least in some cases the FCC 120 may override the automatic mode selection for a particular electromechanical motor if needed.

According to embodiments of the present invention, if a critical fault associated with one of the electromechanical motors is detected or if the FCC 120 sends one of the electromechanical motors into Failsafe mode 408, that electromechanical motor gets a chance to automatically reset itself up to N number of times, where N is a pre-defined number. If the electromechanical motor 306 stops receiving commands from the FCC 120 and no other electromechanical motor is available, the electromechanical motor 306 is configured to automatically transfer into the Hold mode 404 and hold its current position. If the electromechanical motor 306 stops receiving commands from the FCC 120 and one or more other electromechanical motors are available, the electromechanical motor 306 is configured to automatically transfer into the Standby mode 406. According to embodiments of the present invention, the disclosed multi-redundant actuator system is configured to prioritize Normal modes 410, 412 over all other modes. The electromechanical motor 306 is configured to transition from Hold mode 404 to Normal mode 410, 412 only in response to receiving a valid command from the FCC 120. In addition, the electromechanical motor 306 is configured to transition from Hold mode 404 to Standby mode 406 if at least one of the plurality of electromechanical motors 306 is operating in one of the Normal modes 410, 412.

Figure 5A:
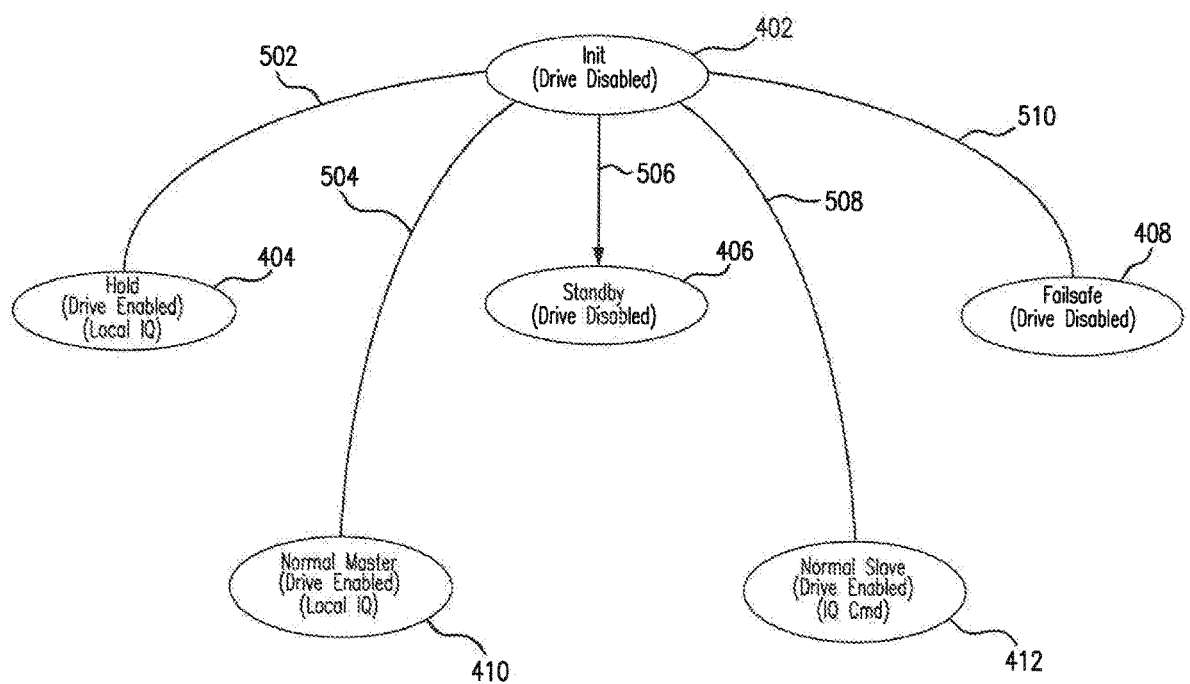
FIGS. 5A-5F illustrate a plurality of transitions for each state of the diagram of FIG. 4, in accordance with an embodiment of the present invention.

FIGS. 5A-5F illustrate in detail various transitions supported by the disclosed multi-redundant actuator system. FIG. 5A illustrates available transitions for an electromechanical motor operating in the Init mode 402. According to an embodiment of the present invention, the electromechanical motor 306 transitions 502 from the Init mode 402 to the Hold mode 404, in response to receiving no commands from the FCC 120 for a predefined number of communication cycles and in response to determining that all of the other electromechanical motors are operating in a mode different from the Master mode 410 and the Hold mode 404. In other words, the system is configured to ensure that there is only one electromechanical motor having a "master" designation. The electromechanical motor 306 transitions 504 from the Init mode 402 to the Master mode 410, in response to either receiving a master command indicating a master designation from the FCC 120 or in response to determining that no other electromechanical motor is operating in the Master mode 410. Transition 504 is configured to ensure that there is always at least one electromechanical motor operating in the Master mode 410.

According to an embodiment of the present invention, the electromechanical motor 306 transitions 506 from the Init mode 402 to the Standby mode 406, if the electromechanical motor's initialization routine has been successfully completed and the minimum initialization time is exceeded, or in response to receiving an invalid master command from the FCC 120 or in response to electromechanical motor's drive being disabled. In one embodiment, the invalid master command may occur if the FCC 120 commands one of the electromechanical motors to operate in the Master mode 410, but that electromechanical motor actually experiences some kind of communication protocol issues. As noted above, one of the electromechanical motors may be intentionally left in the Standby mode 406 if another electromechanical motor powers the flight surface. In this scenario, the electromechanical motor operating in the Standby mode 406 provides as little resistance to flight surface's movement as possible.

With continued reference to FIG. 5A, if the electromechanical motor 306 determines that at least one other electromechanical motor is operating in either Master mode 410 or Hold mode 404 then transition 508 is made to the Slave mode 412. Alternatively, the Slave mode 412 may be entered 508 from the Init mode 402, in response to detecting the master command being sent from the FCC 120 to another one of the plurality of electromechanical motors within the system. The transition 510 between the Init mode 402 and the Failsafe mode 408 may be made in response to detecting a critical fault. In one embodiment, a critical fault may include an electronic defect or failure.

Figure 5B:
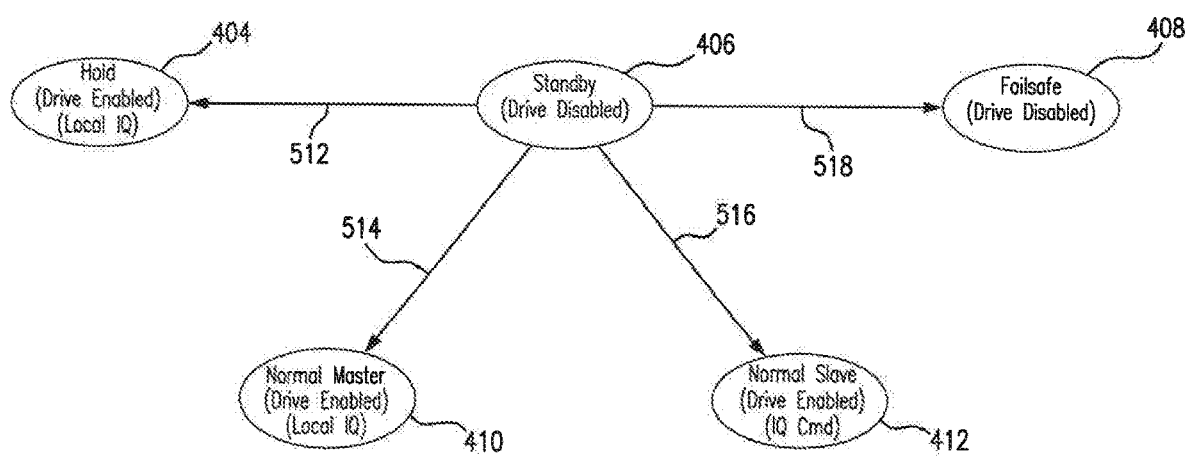

FIG. 5B illustrates available transitions for an electromechanical motor operating in the Standby mode 406. According to an embodiment of the present invention, the electromechanical motor 306 transitions 512 from the Standby mode 406 to the Hold mode 404, if the electromechanical motor 306 determines that its drive is enabled and in response to receiving no commands from the FCC 120 for a predefined number of communication cycles and in response to determining that all of the other electromechanical motors are operating in a mode different from the Master mode 410 and the Hold mode 404. Another exit criterion for the transition 512 may include the determination that all cross lane data links (between the plurality of electromechanical motors) are valid. The electromechanical motor 306 transitions 514 from the Standby mode 406 to the Master mode 410, if electromechanical motor's 306 drive 308 is enabled and in response to either receiving a command indicating a master designation from the FCC 120 or in response to determining that no other electromechanical motor is operating in the Master mode 410.

Still referring to FIG. 5B, if the electromechanical motor 306 determines that its drive is enabled and at least one other electromechanical motor is operating in either Master mode 410 or Hold mode 404, then transition 516 is made to the Slave mode 412. Alternatively, the Slave mode 412 may be entered 516 from the Standby mode 406, in response to detecting the master command being sent from the FCC 120 to another one of the plurality of electromechanical motors within the system. The transition 518 between the Standby mode 406 and the Failsafe mode 408 may be made in response to detecting a critical fault.

Figure 5C:
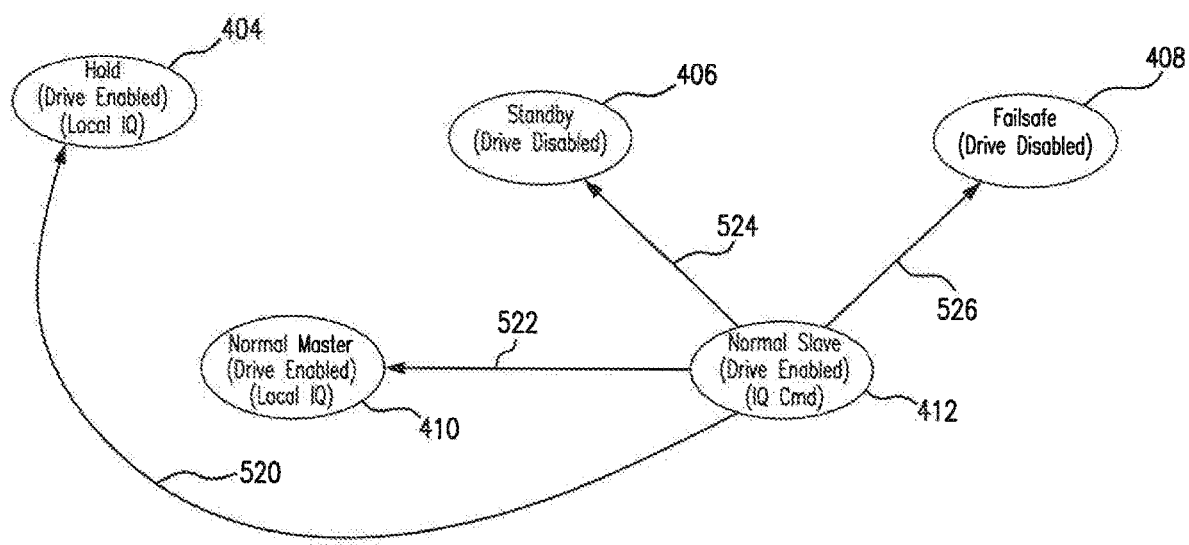

FIG. 5C illustrates available transitions for an electromechanical motor operating in the Slave mode 412. According to an embodiment of the present invention, the electromechanical motor 306 transitions 520 from the Slave mode 412 to the Hold mode 404, in response to receiving no commands from the FCC 120 for a predefined number of communication cycles and in response to lost communication with all other redundant electromechanical motors or in response to determining that all of the other electromechanical motors are operating in a mode different from the Hold mode 404 and the other electromechanical motors report loss of communication with the FCC 120 or if the other electromechanical motors are operating in a mode different from the Slave mode 412 and different from the Master mode 410. The electromechanical motor 306 transitions 522 from the Slave mode 412 to the Master mode 410, in response to either receiving a master designation from other electromechanical motors and Big Brother Logic (BBL) being active or in response to BBL not being active and receiving a command indicating a master designation over a valid communication link with the FCC 120. In various embodiments, the BBL is designed to resolve conflicts between redundant electromechanical motors and to determine corrective action. Another exit criterion for the transition 522 may include a receipt of a command indicating a designation different from the master designation and the determination that no other electromechanical motor is operating in the Master mode 410.

With further reference to FIG. 5C, if the electromechanical motor 306 determines that its drive is disabled or if an invalid master command is received from the FCC 120, then transition 524 is made to the Standby mode 406. The transition 526 between the Slave mode 412 and the Failsafe mode 408 may be made in response to detecting a critical fault.

Figure 5D:
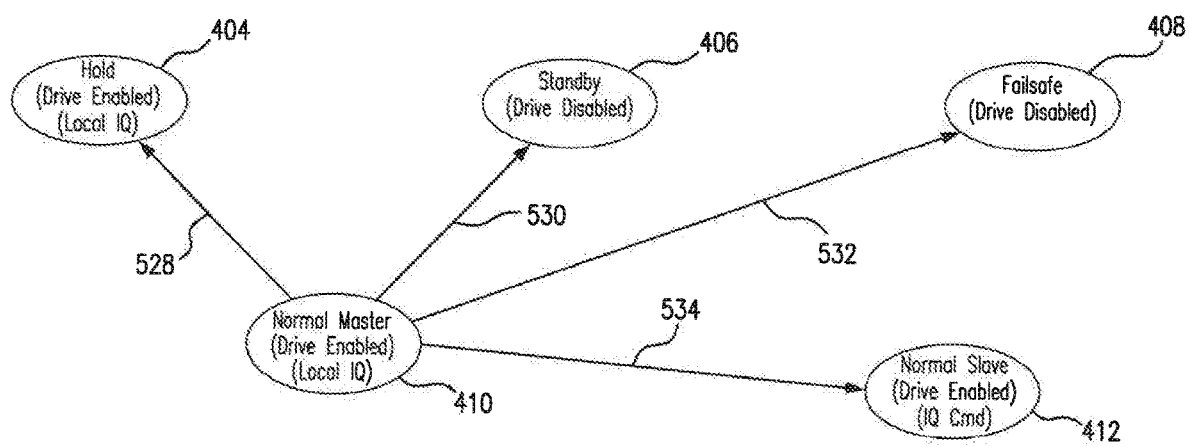

FIG. 5D illustrates available transitions for an electromechanical motor operating in the Master mode 410. According to an embodiment of the present invention, the electromechanical motor 306 transitions 528 from the Master mode 410 to the Hold mode 404, in response to receiving no commands from the FCC 120 for a predefined number of communication cycles and in response to determining that all of the other electromechanical motors are operating in a mode different from the Master mode 410. The electromechanical motor 306 transitions 530 from the Master mode 410 to the Standby mode 406, if the electromechanical motor 306 determines that the drive 308 is disabled or if the electromechanical motor 306 determines that the invalid master command was received from the FCC 120.

Still referring to FIG. 5D, if the electromechanical motor 306 determines that BBL is being active and in response to at least one of the other ones of the plurality of electromechanical motors sending a master command indicating a master designation to a different one of the other ones of the plurality of electromechanical motors, the electromechanical motor 306 transitions 534 from the Master mode 410 to the Slave mode 412. It should be noted that if two or more electromechanical motors 306 operate in the Master mode 410 simultaneously, the FCC 120 may be configured to pick the designated master electromechanical motor by sending a new identification number to the picked electromechanical motor. Advantageously, in such scenario the configured control logic enables other electromechanical motors to switch to other modes of operation automatically. Other exit criteria for the transition 534 may include 1) BBL being inactive and a receipt of a command indicating master designation sent from the FCC 120 to a different electromechanical motor; or 2) detecting that at least one of the other ones of the plurality of electromechanical motors having a lower identification number is operating in the Master mode 410. The transition 532 between the Normal mode 410 and the Failsafe mode 408 may be made in response to detecting a critical fault.

Figure 5E:
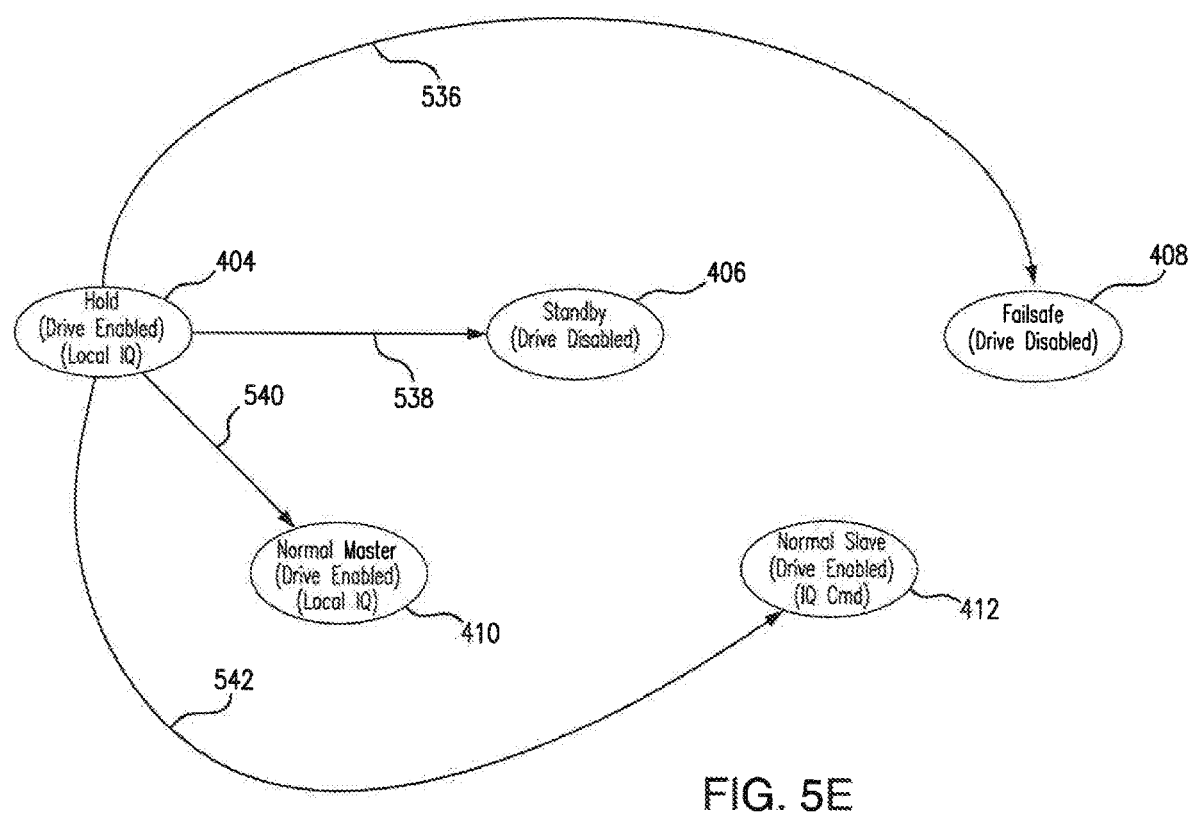

FIG. 5E illustrates available transitions for an electromechanical motor operating in the Hold mode 404. According to an embodiment of the present invention, the electromechanical motor 306 transitions 538 from the Hold mode 404 to the Standby mode 406, if the electromechanical motor 306 determines that the drive 308 is disabled or if the electromechanical motor 306 determines that the invalid master command was received from the FCC 120. The electromechanical motor 306 transitions 540 from the Hold mode 404 to the Master mode 410, in response to having an operable link with the FCC 120 and either in response to receiving a command from the FCC 120 indicating the current master designation is valid or in response to receiving a master designation command from the FCC 120.

Still referring to FIG. 5E, if the electromechanical motor 306 receives a command from the FCC 120 confirming a valid master designation and all cross lane data links (between the plurality of electromechanical motors) are valid and at least one other electromechanical motor operates in the Master mode 410 and in response to determining that all of the other ones of the plurality of electromechanical motors are connected to each other and are connected to the FCC 120, the electromechanical motor 306 transitions 542 from the Hold mode 404 to the Slave mode 412. The transition 536 between the Hold mode 404 and the Failsafe mode 408 may be made in response to detecting a critical fault.

Figure 5F:
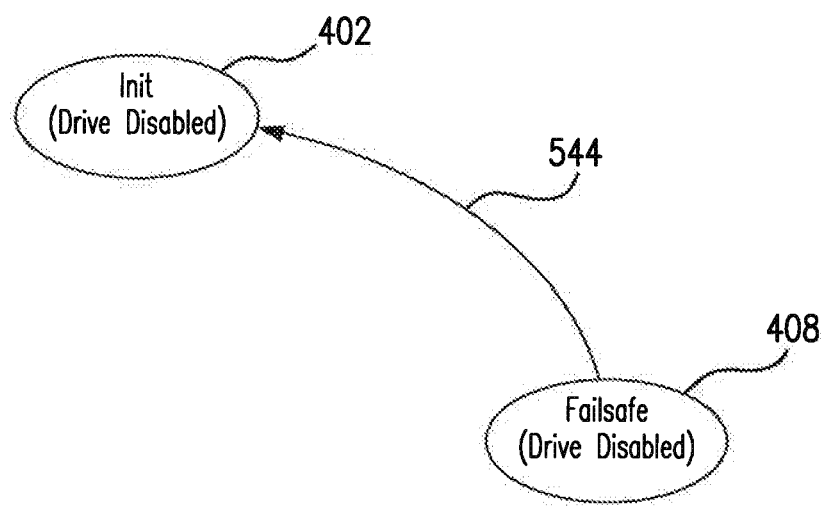

FIG. 5F illustrates available transition for an electromechanical motor operating in the Failsafe mode 408. As noted above, according to embodiments of the present invention, if a critical fault associated with one of the electromechanical motors is detected, that electromechanical motor gets a chance to automatically reset itself up to N number of times, where N is a pre-defined number. The transition 544 between the Failsafe mode 404 and the Init mode 402 may be made only if the number of retries is lower than a threshold number N.

In summary, various embodiments of the present invention are directed to a multi-redundant actuator control system. The redundant electromechanical motors communicate with each other to determine which one is in control (master mode) and which electromechanical motors slave to the master (slave mode). Advantageously, embodiments of the present invention provide the redundant actuator capable of self-configuring autonomously from a command source. The command source is typically a flight control computer operable in a flight state and a ground state. According to embodiments of the present invention, the redundant actuator is configured to control performance of the redundant suite of electromechanical motors prior to commands being available from the command source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages that can be converted to a machine language. The program code may also be written in a Hardware Descriptor Language (HDL). HDLs are frequently used to specify circuit designs for an integrated circuit (IC), such as a field programmable gate array (FPGA), application specific integrated circuit (ASIC), or the like. An electronic design automation (EDA) tool compiles HDL code specifying a circuit design for implementation in a target IC. Example HDLs include Verilog, SystemVerilog, and VHDL.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A fly-by-wire system comprising:
   an electromechanical actuator comprising a plurality of electromechanical motors, each one the plurality of electromechanical motors is configured and operable to:
      exchange operating status information with other ones of the plurality of electromechanical motors; and
      automatically configure itself for optimal mode of operation based on the received operating status information of at least one of the other ones of the plurality of electromechanical motors; and
   a flight control computer operatively connected to each one of the plurality of electromechanical motors of the electromechanical actuator,
   wherein:
      the optimal mode is selected from at least one inactive mode and three active modes, the three active modes include at least a Slave mode and a Master mode,
      the optimal mode is the Master mode when the electromechanical motor determines that no other electromechanical motor of the plurality of electromechanical motors is operating in the Master mode, the electromechanical motor being configured to ignore the flight control computer to not transition into another mode instead of the optimal mode,
      when operating in the Master mode, the electromechanical motor controls and manages the other electromechanical motors of the plurality of electromechanical motors, and
      when operating in the Slave mode, the electromechanical motor allows itself to be controlled or managed by another electromechanical motor of the plurality of electromechanical motors that is operating in the Master mode.

2. The system of claim 1, wherein the inactive modes include at least one of the following: Init mode, Standby mode, and Failsafe mode, and the active mode further includes Hold mode.

3. The system of claim 2, wherein one of the plurality of electromechanical motors is operating in the Init mode and wherein the one of the plurality of electromechanical motors is configured to transfer to the optimal mode comprising:
   the Hold mode, in response to receiving no commands from the flight control computer for a predefined number of communication cycles and in response to determining that the other ones of the plurality of electromechanical motors are operating in a mode different from the Master mode and different from the Hold mode;
   the Master mode, in response to receiving a master command indicating master designation from the flight control computer or in response to determining that all of the other ones of the plurality of electromechanical motors are operating in a mode different from the Master mode;
   the Standby mode, in response to determining that an initialization routine of the electromechanical motor's is complete and in response to receiving an invalid master command from the flight control computer or in response to a drive of the electromechanical motor being disabled;
   the Slave mode, in response to determining that at least one of the other ones of the plurality of electromechanical motors is operating in the Master mode or is operating in the Hold mode or in response to detecting a master command indicating master designation sent from the flight control computer to one of the other ones of the plurality of electromechanical motors;
   the Failsafe mode, in response to detecting a critical fault.

4. The system of claim 2, wherein one of the plurality of electromechanical motors is operating in the Standby mode and wherein the one of the plurality of electromechanical motors is configured to transfer to the optimal mode comprising:
   the Hold mode, in response to a drive of the electromechanical motor being enabled and in response to receiving no commands from the flight control computer for a predefined number of communication cycles and in response to determining that all of the other ones of the plurality of electromechanical motors are operating in a mode different from the Master mode and different from the Hold mode;
   the Master mode, in response to the electromechanical motor's drive being enabled and in response to receiving a master command indicating master designation from the flight control computer or in response to determining that all of the other ones of the plurality of electromechanical motors are operating in a mode different from the Master mode;
   the Slave mode, in response to the electromechanical motor's drive being enabled and in response to determining that at least one of the other ones of the plurality of electromechanical motors is operating in the Master mode or is operating in the Hold mode or in response to detecting a master command indicating master designation sent from the flight control computer to one of the other ones of the plurality of electromechanical motors;
   the Failsafe mode, in response to detecting a critical fault.

5. The system of claim 2, wherein one of the plurality of electromechanical motors is operating in the Slave mode and wherein the one of the plurality of electromechanical motors is configured to transfer to the optimal mode comprising:
   the Hold mode, in response to receiving no commands from the flight control computer for a predefined number of communication cycles and in response to lost communication with all of the other ones of the plurality of electromechanical motors or in response to determining that all of the other ones of the plurality of electromechanical motors are operating in a mode different from the Hold mode and all of the other ones of the plurality of electromechanical motors lost communication with the flight control computer;

the Master mode, in response to receiving a master command indicating master designation from at least one of the other ones of the plurality of electromechanical motors and in response to Big Brother Logic (BBL) being active or in response to the BBL being inactive and in response to receiving a master command indicating a master designation from the flight control computer;

the Standby mode, in response to a drive of the electromechanical motor being disabled or in response to receiving an invalid master command from the flight control computer;

the Failsafe mode, in response to detecting a critical fault.

6. The system of claim 2, wherein one of the plurality of electromechanical motors is operating in the Master mode and wherein the one of the plurality of electromechanical motors is configured to transfer to the optimal mode comprising:

the Hold mode, in response to receiving no commands from the flight control computer for a predefined number of communication cycles and in response to determining that all of the other ones of the plurality of actuators are operating in a mode different from the Master mode;

the Standby mode, in response to a drive of the electromechanical motor being disabled or in response to receiving invalid master command from the flight control computer;

the Slave mode, in response to BBL being active and in response to at least one of the other ones of the plurality of electromechanical motors sending a master command indicating a master designation to a different one of the other ones of the plurality of electromechanical motors or in response to the BBL being inactive and in response to detecting the command indicating master designation sent from the flight control computer to one of the other ones of the plurality of electromechanical motors or in response to detecting that at least one of the other ones of the plurality of electromechanical motors having a lower identification number is operating in the Master mode;

the Failsafe mode, in response to detecting a critical fault.

7. The system of claim 2, wherein one of the plurality of electromechanical motors is operating in the Hold mode and wherein the one of the plurality of electromechanical motors is configured to transfer to the optimal mode comprising:

the Standby mode, in response to a drive of the electromechanical motor being disabled or in response to receiving invalid master command from the flight control computer;

the Master mode, in response to receiving a command indicating that a current master designation is valid from the flight control computer or in response to receiving a master command indicating a master designation from the flight control computer;

the Slave mode, in response to receiving a command indicating that a current master designation is valid from the flight control computer or in response to receiving a master command indicating a master designation from the flight control computer and in response to determining that at least one of the other ones of the plurality of electromechanical motors is operating in the Master mode and in response to determining that all of the other ones of the plurality of electromechanical motors are connected to each other and are connected to the flight control computer;

the Failsafe mode, in response to detecting a critical fault.

8. The system of claim 2, wherein one of the plurality of electromechanical motors is operating in the Failsafe mode and wherein the one of the plurality of electromechanical motors is configured to transfer to the Init mode in response to determining that a number of preceding attempts to transfer to the Init mode is lower than a predefined reset threshold.

9. The system of claim 2, wherein one of the plurality of electromechanical motors operating in the Init mode is configured to run an initialization routine of the electromechanical motor.

10. A method for autonomously reconfiguring a multi-redundant actuator control system, the method comprising steps of:

exchanging operating status information between a plurality of electromechanical motors within an electromechanical actuator and a flight control computer, wherein the flight control computer is operatively connected to the plurality of electromechanical motors; and automatically configuring each of the plurality of electromechanical motors for optimal mode of operation based on the exchanged operating status information, wherein:

the optimal mode is selected from at least one inactive mode and three active modes, the three active modes include at least a Slave mode and a Master mode, the optimal mode is the Master mode when the electromechanical motor determines that no other electromechanical motor of the plurality of electromechanical motors is operating in the Master mode, the electromechanical motor being configured to ignore the flight control computer to not transition into another mode instead of the optimal mode, when operating in the Master mode, the electromechanical motor controls and manages the other electromechanical motors of the plurality of electromechanical motors, and when operating in the Slave mode, the electromechanical motor allows itself to be controlled or managed by another electromechanical motor of the plurality of electromechanical motors that is operating in the Master mode.

11. The method of claim 10, wherein the optimal mode comprises one of the following: Init mode, Standby mode, and Failsafe mode, and the active mode further includes Hold mode.

12. The method of claim 11, wherein one of the plurality of electromechanical motors is operating in the Init mode and wherein the method further comprises the step of transferring to the optimal mode comprising:

the Hold mode, in response to receiving no commands from the flight control computer for a predefined number of communication cycles and in response to determining that the other ones of the plurality of electromechanical motors are operating in a mode different from the Master mode and different from the Hold mode;

the Master mode, in response to receiving a master command indicating master designation from the flight control computer or in response to determining that all of the other ones of the plurality of electromechanical motors are operating in a mode different from the Master mode;

the Standby mode, in response to determining that an initialization routine of the electromechanical motor's is complete and in response to receiving an invalid master command from the flight control computer or in response to a drive of the electromechanical motor being disabled;

the Slave mode, in response to determining that at least one of the other ones of the plurality of electromechanical motors is operating in the Master mode or is operating in the Hold mode or in response to detecting a master command indicating master designation sent from the flight control computer to one of the other ones of the plurality of electromechanical motors;

the Failsafe mode, in response to detecting a critical fault.

13. The system of claim 11, wherein one of the plurality of electromechanical motors is operating in the Standby mode and wherein the method further comprises the step of transferring to the optimal mode comprising:

the Hold mode, in response to a drive of the electromechanical motor being enabled and in response to receiving no commands from the flight control computer for a predefined number of communication cycles and in response to determining that all of the other ones of the plurality of electromechanical motors are operating in a mode different from the Master mode and different from the Hold mode;

the Master mode, in response to the electromechanical motor's drive being enabled and in response to receiving a master command indicating master designation from the flight control computer or in response to determining that all of the other ones of the plurality of electromechanical motors are operating in a mode different from the Master mode;

the Slave mode, in response to electromechanical motor's drive being enabled and in response to determining that at least one of the other ones of the plurality of electromechanical motors is operating in the Master mode or is operating in the Hold mode or in response to detecting a master command indicating master designation sent from the flight control computer to one of the other ones of the plurality of electromechanical motors;

the Failsafe mode, in response to detecting a critical fault.

14. The method of claim 11, wherein one of the plurality of electromechanical motors is operating in the Slave mode and wherein the method further comprises the step of transferring to the optimal mode comprising:

the Hold mode, in response to receiving no commands from the flight control computer for a predefined number of communication cycles and in response to lost communication with all of the other ones of the plurality of electromechanical motors or in response to determining that all of the other ones of the plurality of electromechanical motors are operating in a mode different from the Hold mode and all of the other ones of the plurality of electromechanical motors lost communication with the flight control computer;

the Master mode, in response to receiving a master command indicating master designation from at least one of the other ones of the plurality of electromechanical motors and in response to Big Brother Logic (BBL) being active or in response to the BBL being inactive and in response to receiving a master command indicating a master designation from the flight control computer;

the Standby mode, in response to a drive of the electromechanical motor being disabled or in response to receiving invalid master command from the flight control computer;

the Failsafe mode, in response to detecting a critical fault.

15. The method of claim 11, wherein one of the plurality of electromechanical motors is operating in the Master mode and wherein the method further comprises the step of transferring to the optimal mode comprising:

the Hold mode, in response to receiving no commands from the flight control computer for a predefined number of communication cycles and in response to determining that all of the other ones of the plurality of actuators are operating in a mode different from the Master mode;

the Standby mode, in response to a drive of the electromechanical motor being disabled or in response to receiving invalid master command from the flight control computer;

the Slave mode, in response to BBL being active and in response to at least one of the other ones of the plurality of electromechanical motors sending a master command indicating a master designation to a different one of the other ones of the plurality of electromechanical motors or in response to the BBL being inactive and in response to detecting the command indicating master designation sent from the flight control computer to one of the other ones of the plurality of electromechanical motors or in response to detecting that at least one of the other ones of the plurality of electromechanical motors having a lower identification number is operating in the Master mode;

the Failsafe mode, in response to detecting a critical fault.

16. The method of claim 11, wherein one of the plurality of electromechanical motors is operating in the Hold mode and wherein the method further comprises the step of transferring to the optimal mode comprising:

the Standby mode, in response to a drive of the electromechanical motor the being disabled or in response to receiving invalid master command from the flight control computer;

the Master mode, in response to receiving a command indicating that a current master designation is valid from the flight control computer or in response to receiving a master command indicating a master designation from the flight control computer;

the Slave mode, in response to receiving a command indicating that a current master designation is valid from the flight control computer or in response to receiving a master command indicating a master designation from the flight control computer and in response to determining that at least one of the other ones of the plurality of electromechanical motors is operating in the Master mode and in response to determining that all of the other ones of the plurality of electromechanical motors are connected to each other and are connected to the flight control computer;

the Failsafe mode, in response to detecting a critical fault.

17. The method of claim 11, wherein one of the plurality of electromechanical motors is operating in the Failsafe mode and wherein the method further comprises the step of transferring to the Init mode in response to determining that a number of preceding attempts to transfer to the Init mode is lower than a predefined reset threshold.

18. The method of claim 11, wherein one of the plurality of electromechanical motors operating in the Init mode is configured to run an initialization routine of the electromechanical motor.

* * * * *